United States Patent
Okada et al.

(10) Patent No.: US 8,293,134 B2
(45) Date of Patent: Oct. 23, 2012

(54) OPTICALLY ANISOTROPIC MATERIAL, OPTICAL ELEMENT AND OPTICAL INFORMATION WRITING/READING DEVICE

(75) Inventors: Satoshi Okada, Koriyama (JP); Hiroshi Kumai, Koriyama (JP); Makota Hasegawa, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/979,915

(22) Filed: Dec. 28, 2010

(65) Prior Publication Data

US 2011/0089372 A1    Apr. 21, 2011

Related U.S. Application Data

(63) Continuation of application No. PCT/JP2009/061885, filed on Jun. 29, 2009.

(30) Foreign Application Priority Data

Jun. 30, 2008    (JP) ................. 2008-170499

(51) Int. Cl.
*C09K 19/00*    (2006.01)
*C09K 19/12*    (2006.01)
*C09K 19/20*    (2006.01)
*C09K 19/30*    (2006.01)
*C07C 69/76*    (2006.01)

(52) U.S. Cl. ........... 252/299.01; 252/299.6; 252/299.63; 252/299.66; 252/299.67; 428/1.1; 560/55; 560/59; 560/61; 560/64; 560/76; 560/84; 560/128

(58) Field of Classification Search ............. 252/299.01, 252/299.6, 299.63, 299.66, 299.67; 428/1.1, 428/1.3; 430/20; 560/55, 59, 61, 64, 76, 560/84, 128

See application file for complete search history.

(56) References Cited

U.S. PATENT DOCUMENTS

| 6,899,929 B2 * | 5/2005 | Verrall et al. ................. 428/1.1 |
| 2006/0124900 A1 | 6/2006 | Kumai et al. |
| 2009/0128769 A1 | 5/2009 | Shioya et al. |
| 2010/0103366 A1 * | 4/2010 | Farrand et al. ................. 349/183 |

FOREIGN PATENT DOCUMENTS

| DE | 10 2005 024 400 | 11/2006 |
| JP | 2001-281447 | 10/2001 |
| JP | 2004-263037 | 9/2004 |
| JP | 2006-215184 | 8/2006 |
| JP | 2009-120547 | 6/2009 |
| WO | 89/11496 | 11/1989 |
| WO | 2005/014522 | 2/2005 |
| WO | 2008/061606 | 5/2008 |

OTHER PUBLICATIONS

International Search Report issued Aug. 18, 2009 in PCT/JP09/061885 filed Jun. 29, 2009.

* cited by examiner

*Primary Examiner* — Geraldina Visconti
(74) *Attorney, Agent, or Firm* — Oblon, Spivak, McClelland, Maier & Neustadt, L.L.P.

(57) ABSTRACT

An optically anisotropic material having a good durability against light is provided. Further, an optical element having a good durability against light and an optical information writing/reading device employing such an element are provided.

The optically anisotropic material is obtainable by polymerizing a polymerizable liquid crystal composition containing at least 5 mol % of at least one type of polymerizable compound represented by a general formula $CH_2=CR^1—COO—K—Cy—Cy—L—OCO—CR^2=CH_2$. A phase difference plate 4 produced by employing the optically anisotropic material has a good durability against light, and accordingly, the phase difference plate 4 can realize an optical heat device suitable for large capacity writing/reading by employing a blue laser as a light source 1.

12 Claims, 2 Drawing Sheets

OPTICALLY ANISOTROPIC MATERIAL, OPTICAL ELEMENT AND OPTICAL INFORMATION WRITING/READING DEVICE

TECHNICAL FIELD

The present invention relates to an optically anisotropic material, an optical element and an optical information writing/reading device.

BACKGROUND ART

On a surface of an optical disk such as a CD (compact disk) or a DVD (digital versatile disk), concaves and convexes called as pits are provided. An optical head device is a device for radiating a laser beam to an optical disk and detecting light reflected from the disk to read an information recorded in the pits.

For example, linearly polarized light emitted from a light source is transmitted through a beam splitter, a collimator lens, a phase difference plate and an objective lens to reach an information recording plane of an optical disk. In this outgoing path, the linearly polarized light is straightly transmitted through the beam splitter and transformed into circularly polarized light by the phase difference plate. The circularly polarized light is reflected by the information recording plane of the optical disk to be circularly polarized light in the reverse direction, and is transmitted through the objective lens, the phase difference plate and the collimator lens in the returning path in the reverse order to the order of the outgoing path. In the returning path, the light is transformed by the phase difference plate into linearly polarized light polarized in a direction perpendicular to that of incident light. Accordingly, light in the returning path is linearly polarized in a direction 90° different from that of the light in the outgoing path, whereby the propagation direction of the light is turned by 90° by the beam splitter and the light reach a photodetector.

In the optical head device, if e.g. fluctuation of tilt of the optical disk occurs, the focal position of beam spot deviates from the recording surface. Accordingly, a servo mechanism for detecting and compensating such a deviation to make the beam spot follow the concave/convex pits in the recording surface. Such a mechanism is configured to adjust the focus of the beam spot emitted from a laser light source on the recording surface to detect a tracking position, so that the beam spot follows an objective track. Further, in the optical head device, it is necessary to prevent a laser beam reflected by the recording surface without hitting the pits from returning to the light source.

For these reasons, the optical head device requires an optical element for modulating (polarizing, diffracting, phase-adjusting, etc.) the laser beam from the light source. For example, the above phase difference plate has a function of effecting different refractive index depending on the angle between the optical axis of the phase difference plate and the phase plane of incident light, and shifting the phases of the two components of light produced by birefringence. The two light components having phases shifted from each other are synthesized when the light is output from the phase difference plate. The magnitude of the shift of the phase is determined by the thickness of the phase difference plate. Accordingly, by adjusting the thickness, a quarter wavelength plate for shifting the phase by $\pi/2$, a half wavelength plate for shifting the phase by $\pi$, etc. can be produced. For example, linearly polarized light passed through a quarter wavelength plate becomes circularly polarized light, and linearly polarized light passed through a half wavelength plate becomes linearly polarized light having a polarization plane tilted by 90°. By using such a characteristic and combining a plurality of optical elements, the above servo mechanism can be constructed. Further, the above optical element is employed also for preventing a laser beam reflected by the recording surface without hitting pits from returning to the light source.

The above optical element can be produced by employing a liquid crystal material. For example, a liquid crystal molecule having a polymerizable functional group has both a characteristic of polymerizable monomer and a characteristic of liquid crystal. Accordingly, when such liquid crystal molecules each having a polymerizable functional group are aligned and polymerized, an optically anisotropic material wherein alignment of the liquid crystal molecules are fixed can be obtained. Such an optically anisotropic material has an optical anisotropy such as a refractive index anisotropy derivable from a mesogenic structure, and by using this characteristic, a diffraction element or a phase difference plate is produced. As such an optically anisotropic material, for example, Patent Document 1 discloses a polymer liquid crystal obtained by polymerizing a liquid crystal composition containing a compound represented by $CH_2$=CH—COO-Ph-OCO-Cy-Z (Z: alkyl group).

By the way, the above optical element is commonly required to have the following characteristics.

1) The optical element has an appropriate retardation value (Rd value) depending on wavelength to be used and application of the element.

2) Optical characteristics (Rd value, transmittance, etc.) are uniform in the entire surface of the optical element.

3) There is little scattering or absorption at the wavelength to be used.

4) Optical characteristics of the optical element can be easily adjusted to those of other materials constituting the element.

5) Wavelength dispersion of the refractive index or the refractive index anisotropy is small at wavelength to be used.

Particularly, it is important to have a proper Rd value indicated in item 1). Here, Rd value is a value defined by a formula $Rd = \Delta n \times d$ where $\Delta n$ is a refractive index anisotropy and d is the thickness of the optical element in the propagation direction of light. In order to obtain a desired Rd value, if $\Delta n$ of a liquid crystal material forming the optical element is small, it is necessary to increase the thickness d. However, if the thickness d increases, it becomes difficult to align the liquid crystal molecules, whereby it becomes difficult to obtain a desired optical characteristic. On the other hand, if $\Delta n$ is large, it is necessary to decrease the thickness d, and in this case, it becomes difficult to precisely control the thickness. Accordingly, it is extremely important for such a liquid crystal material to have a proper $\Delta n$ value.

In recent years, in order to increase the capacity of optical disks, use of laser beam having a shorter wavelength for writing or reading of an information has been in progress to reduce the concave/convex pit size of optical disks. For example, a laser beam having a wavelength of 780 nm is used for CDs, a laser beam having a wavelength of 650 nm is used for DVDs, and a laser beam having a wavelength of 405 nm is used for BDs (Blu ray Disk (product name)).

In next-generation recording media, still shorter wavelength may be used, and use of a laser beam (hereinafter it is also referred to as blue laser beam) having a wavelength of from 300 to 450 nm, tends to increase from now on. However, the optically anisotropic material described in Patent Document 1 is insufficient in the durability against a blue laser beam.

For example, when a phase difference plate prepared by employing such a liquid crystal is disposed in an optical head device using a blue laser beam as a light source, there occurs generation of aberration, decrease of the transmittance or change of the Rd value in the lapse of time in some cases. This is considered to be because the material of the phase different plate is damaged by exposure to the blue laser beam. If such an aberration is generated, light (light flux) emitted from the light source and transmitted through a collimator lens, a phase difference plate and an objective lens, cannot be focused into a point when it reaches a surface of a recording medium. As a result, light-utilization efficiency decreases and efficiency of reading or writing of an information decreases. Further, when the transmittance decreases, the intensity of light reaching the surface of the recording medium or photodetector becomes low, and in the same manner as above, the efficiency of reading or writing of an information decreases. Further, when the Rd value changes, for example, in a wavelength plate, it is not possible to maintain a desired ellipticity or the extinction ratio of linearly polarized light. As a result, the optical device may not function as an optical head device.

By the way, in order to reduce the size and increase the efficiency of an optical element, it is usually necessary to use a material having a high refractive index anisotropy. In general, a material having a high refractive index anisotropy has a high refractive index. However, since such a high refractive index material has a large wavelength dispersion of refractive index, such a material tends to have a high absorption of short wavelength light (that is, such a material has a high molar extinction coefficient). Accordingly, conventional high refractive index materials have a problem that they have low durability against short wavelength light such as a blue laser beam.

In order to improve durability against light, it is preferred to employ a material having a low molar extinction coefficient such as a compound having a complete alicyclic structure containing no aromatic ring. However, a complete alicyclic liquid crystal monomer usually has a small Δn, and there are problems that a polymer obtained from such a monomer has a further small Δn or such a polymer becomes isotropic, whereby it becomes difficult to obtain a desired liquid crystallinity.

For example, the following two complete alicyclic liquid crystal monomers exhibit optical anisotropy (birefringence), but form an isotropic polymer by polymerization.

$CH_2$=CH—COO-Cy-Cy-$C_3H_7$ $CH_2$=CH—COO-Cy-Cy-$C_5H_{11}$

For this reason, it is necessary to mix each of these monomers with another compound to form an anisotropic polymer. However, since the temperature range in which the above monomers show optical anisotropy is not wide, it is difficult to form a composition having a desired liquid crystallinity even if each of the monomers are mixed with another compound.

PRIOR ART

Patent Documents
Patent Document 1: JP-A-2004-263037

DISCLOSURE OF THE INVENTION

Problems to be Solved by the Invention

The present invention has been made considering the above problems. Namely, an optical element for modulating a laser beam having an wavelength of from 300 nm to 450 nm, is required to employ an optically anisotropic material which shows little degradation even if it is exposed to light in this wavelength band and excellent in the durability, and which is also excellent in liquid crystallinity. Under the circumstances, it is an object of the present invention to provide an optical anisotropic material excellent in the durability against a blue laser beam.

Further, it is an object of the present invention to provide an optical element excellent in the durability against a blue laser beam and an optical information writing/reading device employing such an optical element.

Other objects and merits of the present invention will be clarified from the following descriptions.

Means for Solving the Problems

A first embodiment of the present invention is an optically anisotropic material obtainable by polymerizing a polymerizable liquid crystal composition containing at least 5 mol % of at least one type of the polymerizable compound represented by the following formula (1):

$CH_2$=$CR^1$—COO—K-Cy-Cy-L-OCO—$CR^2$=$CH_2$     (1);

wherein $R^1$ and $R^2$ are each independently a hydrogen atom or a methyl group;

K is —$(CH_2)_p$COO— or —$(CH_2)_q$OCO—, wherein an etheric oxygen atom may be present in a carbon to carbon bond in an alkylene group and some or all of hydrogen atoms may be each substituted by a fluorine atom or a methyl group (where p and q each independently represents an integer of from 1 to 12);

L is —OCO$(CH_2)_r$— or —COO$(CH_2)_s$—, wherein an etheric oxygen atom may be present in a carbon to carbon bond in an alkylene group and some or all of hydrogen atoms may be each substituted by a fluorine atom or a methyl group (where r and s each independently represents an integer of from 1 to 12); and Cy is a trans-1,4-cyclohexylene group wherein some or all of hydrogen atoms may be each substituted by a fluorine atom or a methyl group.

In the above first embodiment, it is preferred that in formula (1), K is —$(CH_2)_p$COO— wherein some or all hydrogen atoms in the alkylene group may be each substituted by a fluorine atom or a methyl group, and L is —OCO$(CH_2)_r$— wherein some or all hydrogen atoms in the alkylene group may be each substituted by a fluorine atom or a methyl group.

In the above first embodiment, it is preferred that in formula (1), $R^1$ and $R^2$ are each a hydrogen atom;

K is —$(CH_2)_p$COO— wherein some or all hydrogen atoms in the alkylene group may be substituted by fluorine atoms; and

L is —OCO$(CH_2)_r$— wherein some or all hydrogen atoms in the alkylene group may be substituted by fluorine atoms.

In the above first embodiment, it is preferred that in formula (1), K is —$(CH_2)_p$COO— wherein the alkylene group is a non-substituted alkylene group; and L is —COO$(CH_2)_r$— wherein the alkylene group is a non-substituted alkylene group.

The above polymerizable liquid crystal composition may contain a polymerizable compound other than the polymerizable compound represented by formula (1). The polymerizable liquid crystal compound preferably has no aromatic ring.

The polymerizable liquid crystal composition may contain as the polymerizable compound other than the polymerizable compound represented by formula (1) at least one type of polymerizable compound selected from the group consisting of a polymerizable compound represented by the following formula (2) and a polymerizable compound represented by the following formula (3):

$$CH_2=CR^3-COO-(M)_m-Cy-Cy-R^4 \quad (2),$$

$$CH_2=CR^5-COO-(N)_n-Cy-COO-Cy-Cy-R^6 \quad (3).$$

Here, in formulae (1) and (2):

$R^3$ and $R^5$ are each independently a hydrogen atom or a methyl group;

$R^4$ and $R^6$ are each independently a $C_{1-12}$ alkyl group wherein some or all hydrogen atoms may be each substituted by a fluorine atom or a methyl group;

M is $-(CH_2)_aCOO-$, $-(CH_2)_bOCO-$, $-(CH_2)_cO-$ or $-(CH_2)_d-$, wherein an etheric oxygen atom may be present in a carbon to carbon bond in the alkylene group and some or all hydrogen atoms may be each substituted by a fluorine atom or a methyl group (where a, b, c and d each independently represents an integer of from 1 to 12);

N is $-(CH_2)_eCOO-$, $-(CH_2)_fOCO-$, $-(CH_2)_gO-$ or $-(CH_2)_h-$, wherein an etheric oxygen atom may be present in a carbon to carbon bond in the alkylene group and some or all hydrogen atoms may be each substituted by a fluorine atom or a methyl group (where e, f, g and h each independently represents an integer of from 1 to 12);

m and n each independently 0 or 1; and

Cy is a trans-1,4-cyclohexylene group wherein some or all hydrogen atoms may be each substituted by a fluorine atom or a methyl group.

The optically anisotropic material of the first embodiment of the present invention is preferably one which is obtainable by polymerizing the polymerizable liquid crystal composition in a state that the polymerizable liquid crystal composition shows a liquid crystal phase and that the liquid crystal is aligned.

A second embodiment of the present invention relates to an optical element employing the optically anisotropic material of the first embodiment of the present invention.

A third embodiment of the present invention relates to an optical information recording/reproduction device for recording an information on an optical recording medium and/or reading an information recorded in an optical recording medium, which employs the optical element of the second embodiment of the present invention.

Effects of the Invention

The first embodiment of the present invention provides an optically anisotropic material having a good durability against a blue laser beam, the second embodiment of the present invention provides an optical element having a good durability against a blue laser beam, and the third embodiment of the present invention provides an optical information writing/reading device employing the optical element and suitable for large capacity.

MODE FOR CARRYING OUT THE INVENTION

First, the optically anisotropic material of the present invention will be described. Here, in the specification, a polymerizable compound represented by formula (1) is also referred to as compound (1). Other compounds are also referred in the same manner. Further, a trans-1,4-cyclohexylene group in this specification may be a non-substituted group wherein hydrogen atoms bonded to carbon atoms in the group are not substituted by other groups, or it may be a group wherein hydrogen atoms bonded to carbon atoms in the group are each substituted by a fluorine atom or a methyl group. Further, when a group having an isometric structure of the structure of the alkyl group is present, the alkyl group means all of such groups. Here, in the present invention, the alkyl group is preferably a linear alkyl group. Further, in this specification, a compound having both liquid crystallinity and polymerizability is referred to as a polymerizable liquid crystal. Further, a wavelength described in the specification includes a range of ±2 nm centering the wavelength, and the refractive index anisotropy is abbreviated as Δn.

The present inventors have conducted extensive studies, and as a result, they have discovered that an optically anisotropic material obtainable by polymerizing a polymerizable liquid crystal composition containing at least 5 mol % of at least one type of compound represented by the following formula (1), has a good durability against a blue laser beam.

$$CH_2=CR^1-COO-K-Cy-Cy-L-OCO-CR^2=CH_2 \quad (1)$$

In formula (1), $R^1$ and $R^2$ each independently represents a hydrogen atom or a methyl group. They are particularly preferably hydrogen atoms. When $R^1$ and $R^2$ are each a hydrogen atom, it is possible to make polymerization progress promptly at a time of photopolymerizing a polymerizable liquid crystal composition containing compound (1) to obtain an optically anisotropic material. Further, there is also a merit that the properties of an optical element employing this optically anisotropic material, are not susceptible to environment such as a temperature, and that the variation of retardation in the entire surface of the optical element becomes small.

In formula (1), Cy is a trans-1,4-cyclohexylene group. Here, some or all of hydrogen atoms in the group may be each substituted by a fluorine atom or a methyl group. By employing a polymerizable compound having such a group as a main structure, it is possible to improve the durability of the optically anisotropic material against light.

Figure 1:
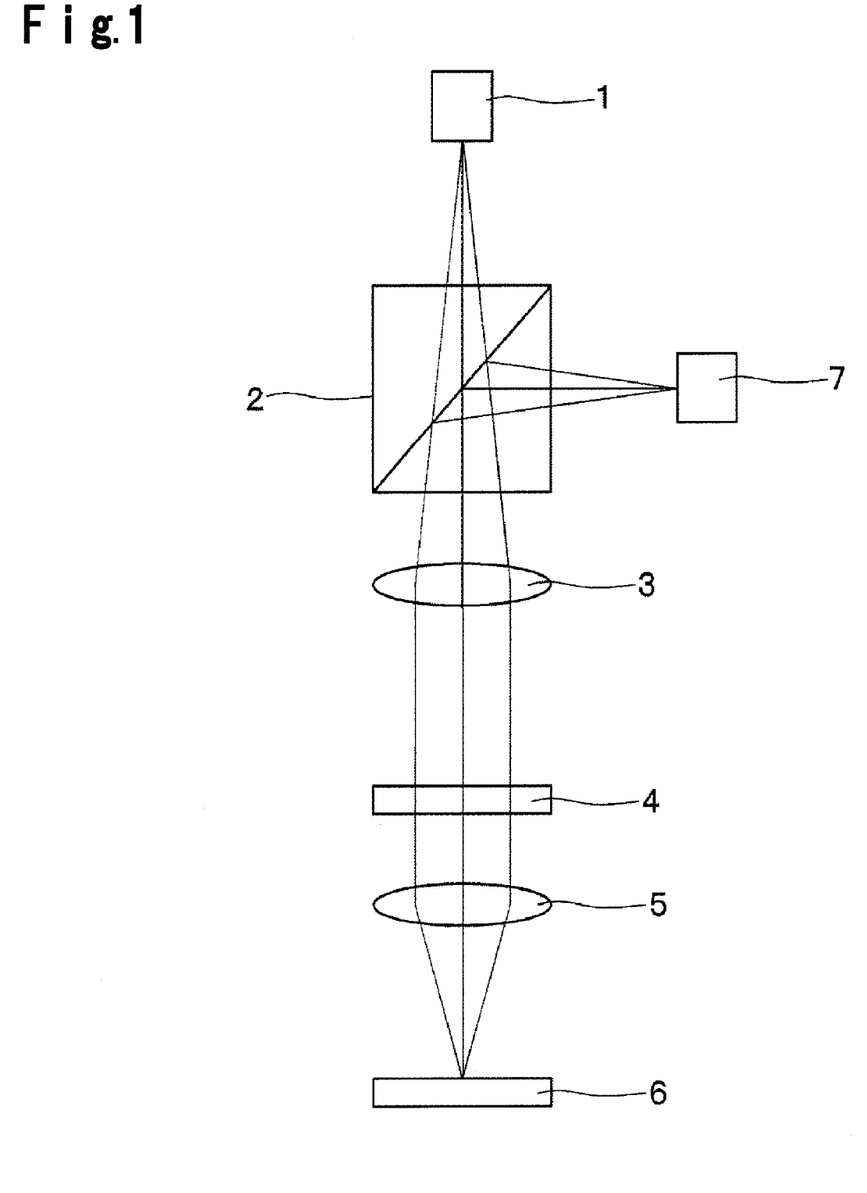
FIG. 1 is a construction view of the optical information writing/reading device of this embodiment of the present invention.

In FIG. 1, K is $-(CH_2)_pCOO-$ or $-(CH_2)_pOCO-$. Here, p and q each independently represents an integer of from 1 to 12. An etheric oxygen atom may be present in a carbon to carbon bond in the alkylene group. Further, some or all of hydrogen atoms may be each substituted by a fluorine atom or a methyl group.

In formula (1), L is $-OCO(CH_2)_r-$ or $-COO(CH_2)_s-$. Here, r and s each independently represents an integer of from 1 to 12. An etheric oxygen atom may be present in a carbon to carbon bond in the alkylene group. Further, a part or all of hydrogen atom may be each substituted by a fluorine atom or a methyl group.

In general, when a polymerizable liquid crystal compound is polymerized, the value of Δn decreases by polymerization. When K and L have the above structures, the decreases of Δn by polymerization can be suppressed. Particularly, it is preferred that K is $-(CH_2)_pCOO-$ wherein a part or all of hydrogen atoms in the alkylene group may be each substituted by a fluorine atom or a methyl group, and that L is $-COO(CH_2)_r-$ wherein a part or all of hydrogen atoms in the alkylene group may be each substituted by a fluorine atom or a methyl group. Further, by selecting the values of p, q, r and s in formula (1) so as to accommodate to molecular lengths of polymerizable compounds other than the compound (1) in the polymerizable liquid crystal composition, it is possible to further suppress decrease of Δn by polymerization.

Further, K and L are preferably each a non-substituted alkylene group that is not an alkylene group wherein some or all of hydrogen atoms in the alkylene group are each substituted by a fluorine atom or a methyl group, in order to facilitate development of liquid crystallinity or hardness of losing the liquid crystallinity.

As a specific example of the compound (1), a compound (1A) represented by the following formula (1A) is preferred since its handling temperature region is low. Here, in formula (1A), p and r each represents an integer of from 1 to 12. Particularly, from the viewpoint of easiness of production, it is preferred that p=r.

the compound (12) is made to react with a potassium hydroxide aqueous solution, with 3,4-dihydro-2H-pyran (DHP) under a pyridinium-paratoluene sulfonic acid catalyst (cat. PPTS), and with a potassium hydroxide aqueous solution in this order to obtain a compound (13). A means heating. Next, trans-trans-bicyclohexanediol (14) obtained by recrystallizing a bicyclohexanediol mixture (14') is reacted with the compound (13) under the presence of 1-ethyl-3-(dimethylaminopropyl)carbodiimide hydrochloride (EDC) and 4-dimethylaminopyridine catalyst (cat. DMAP) to obtain a compound (15). Next, deprotection of the compound (15) is carried out under the presence of methyl alcohol and a pyridinium-paratoluene sulfonic acid catalyst, to obtain a com-

(1A)

Next, an example of synthesis of compound (1) will be described. For example, a compound (1A-1) represented by formula (1A) wherein p=7 and r=7, can be synthesized as follows.

First, a compound (11) is made to react with metachloro perbenzoic acid (m-CPBA) to obtain a compound (12). Next, pound (16), and the compound (16) is made to react with acryloyl chloride. Here, THP of formulae (13) and (15) means tetrahydro-2H-pyran.

By the above process, the compound (1A-1) is obtained.

Further, a compound (1B) is present, which is represented by formula (1) wherein $R^1$ and $R^2$ are hydrogen atoms, K is $(CH_2)_qOCO$— and L is —$COO(CH_2)_s$—. For example, a compound (1 B-1) represented by formula (1B) wherein q=7 and s=7 can be synthesized by the following process.

First, (methoxymethyl)triphenylphosphonium chloride and potassium-tert-butoxide are made to react, and the reacted product is made to further react with a compound (21) and is subjected to treatments with a perchloric acid and sodium hydroxide in this order to obtain a compound (22). Next, the compound (22) is made to react with $2KHSO_5 \cdot KHSO_4 \cdot K_2SO_4$ (product name: "Oxone") in a dimethylformamide (DMF) solution to obtain a compound (23). Separately from this process, a compound (24) is made to react with 3,4-dihydro-2H-pyran (DHP) under the presence of a pyridinium-paratoluene sulfonic acid catalyst (cat. PPTS) to obtain a compound (25). Subsequently, the compound (25) is made to react with sodium acrylate in a hexamethyl phosphoric acid triamide (HMPA) solvent to obtain a compound (26). Subsequently, the compound (26) is made to react with pyridinium-paratoluene sulfonic acid catalyst in methanol to obtain a compound (27). Next, the compound (23) is made to react with oxalyl chloride under the presence of a DMF catalyst to obtain an acid dichloride, and the compound (27) is made to react with the acid dichloride. Here, in formulae (25) and (26), THP means tetrahydro-2H-pyran. By this process, a compound (1B-1) is obtained.

It is possible to synthesize a compound represented by formula (1) wherein $R^1$ is a methyl group, in the same manner by the above synthesizing method except that acrylic acid chloride is changed to methacrylic acid chloride.

The compound (1) alone does not show a nematic phase in some cases depending on the type of substituting group.

In these cases, a polymerizable liquid crystal compound other than the compound (1) is added to the compound (1) to constitute a polymerizable liquid crystal composition. Specifically, at least one type of the compound (1) and at least one type of a polymerizable liquid crystal compound other than the compound (1) are contained to constitute a polymerizable liquid crystal composition so that the polymerizable liquid crystal composition shows a nematic phase. In such a construction, it is possible to obtain a temperature range in which the polymerizable liquid crystal composition shows a nematic phase.

The polymerizable liquid crystal compound other than the compound (1), is preferably a compound having an acryloyl group or a methacryloyl group, particularly preferably a compound having an acryloyl group. Further, the liquid crystal compound preferably has a mesogenic structure containing no aromatic ring for the purpose of improving durability against a blue laser beam.

As the polymerizable liquid crystal compound other than the compound (1) or the polymerizable non-liquid crystal compound having a similar structure to the compound (1), various types of known compounds may be employed. Preferred examples of them include a single functional compound (4) and a dual functional compound (5) as shown below.

$$CH_2=CR^7-COO-R^8-A^1-Y^1-A^2-A^3-A^4-R^9 \quad (4)$$

$$CH_2=CR^{10}-COO-R^{11}-A^5-Y^2-A^6-Y^3-A^7-Y^4-A^8-R^{12}-OCO-CR^{13}=CH_2 \quad (5)$$

$R^7$, $R^{10}$ and $R^{13}$ each independently represents a hydrogen atom or a methyl group.

$R^8$, $R^{11}$ and $R^{12}$ each independently represents a single bond or a $C_{1-15}$ alkylene group, and when it is an alkylene group, an etheric oxygen atom may be present in a carbon-carbon bond in the alkylene group or at an end of the group to be bonded with a cyclic group, and further, a carboxyl group may be present at an end of the group to be bonded with a cyclic group, and some or all of hydrogen atoms bonded to carbon atoms in the alkylene group may be substituted by fluorine atoms.

$R^9$ represents a $C_{1-12}$ alkyl group, a $C_{1-12}$ alkoxy group, a $C_{1-12}$ alkylcarbonyloxy group or a fluorine atom, and when it is the alkyl group, the alkoxy group or the alkylcarbonyloxy group, some or all of hydrogen atoms bonded to carbon atoms in each of these groups may be substituted by fluorine atoms.

$Y^1$ and $Y^2$ each independently represents a single bond or —COO—, $Y^3$ represents a single bond or —CH$_2$—CH$_2$— and $Y^4$ represents a single bond or —OCO—.

$A^1$, $A^2$, $A^3$, $A^4$, $A^5$, $A^6$, $A^7$ and $A^8$ each independently represents a single bond, a trans-1,4-cyclohexylene group or a 1,4-phenylene group. Here, the combination of $A^1$, $A^2$, $A^3$ and $A^4$ and the combination of $A^5$, $A^6$, $A^7$ and $A^8$, each independently includes at most two single bonds and at least one trans-1,4-cyclohexylene group, and in each of these groups, there is no three-continuous 1,4-phenylene groups, and some or all of hydrogen atoms in the trans-1,4-cyclohexylene group or the 1,4-phenylene group may be substituted by fluorine atoms.

As suitable examples of the polymerizable liquid crystal compound other than the compound (1), a compound (compound (2)) represented by the following formula (2) and a compound (compound (3)) represented by the following formula (3) are mentioned.

$$CH_2=CR^3-COO-(M)_m-Cy-Cy-R^4 \quad (2)$$

$$CH_2=CR^5-COO-(N)_n-Cy-COO-Cy-Cy-R^6 \quad (3)$$

In formulae (2) and (3), $R^3$ and $R^5$ are each independently a hydrogen atom or a methyl group.

$R^4$ and $R^6$ are each independently a $C_{1-12}$ alkyl group wherein some or all of hydrogen atoms may be each independently substituted by a fluorine atom or a methyl group.

M is —(CH$_2$)$_a$COO— or —(CH$_2$)$_b$OCO—, —(CH$_2$)$_c$O— or —(CH$_2$)$_d$—, wherein an etheric oxygen atoms is present in a carbon to carbon bond in the alkylene group, some or all of hydrogen atoms may be each independently substituted by a fluorine atom or a methyl group (wherein a, b, c and d each independently represents an integer of from 1 to 12.).

N is —(CH$_2$)$_e$COO—, —(CH$_2$)$_f$OCO—, —(CH$_2$)$_g$O— or —(CH$_2$)$_h$—, wherein an etheric oxygen atom is present in a carbon to carbon bond in the alkylene group and some or all of hydrogen atoms may be each substituted by a fluorine atom or a methyl group (wherein e, f, g and h each independently represents an integer of from 1 to 12.).

m and n is each independently 0 or 1.

Cy is a trans-1,4-cyclohexylene group wherein some or all of hydrogen atoms may be each substituted by a fluorine atom or a methyl group.

As specific examples of compounds (2) and (3), the polymerizable liquid crystal compounds represented by the following formulae are mentioned.

$$CH_2=CH-COO-Cy-Cy-R^4 \quad (2\text{-}1)$$

$$CH_2=CH-COO-(CH_2)_4-OCO-Cy-Cy-R^4 \quad (2\text{-}2)$$

$$CH_2=CH-COO-Cy-COO-Cy-Cy-R^6 \quad (3\text{-}1)$$

$$CH_2=CH-COO-(CH_2)_4-OCO-Cy-COO-Cy-Cy-R^6 \quad (3\text{-}2)$$

Here, even when the compound (1) shows liquid crystallinity, the polymerizable liquid crystal composition may contain the compound (2) and the compound (3). Further, the polymerizable liquid crystal composition may contain a polymerizable liquid crystal compound other than the compounds (2) and (3).

The ratio of the compound (1) to the total amount of the compound (1) and polymerizable liquid crystal compounds other than the compound (1) in the polymerizable liquid crystal composition, is preferably at least 5 mol %. Further, the ratio is preferably from 5 to 70 mol %, particularly preferably from 5 to 50 mol % considering compatibility, and the ratio is further preferably from 20 to 50 mol % from the viewpoint of suppressing lowering of Δn according to increase of the degree of polymerization.

In the present invention, the polymerizable liquid crystal composition may contain a non-polymerizable compound other than polymerizable compounds (compound (1) and polymerizable compounds other than compound (1)), such as a non-polymerizable liquid crystal compound or a non-polymerizable non-liquid crystal compound within a range not deteriorating the effects of the present invention. For example, the amount of an additive selected from the group consisting of a polymerization initiator, a polymerization inhibitor, a chiral agent, an antioxidant, a UV absorber, a photostabilizer and a colorant, is preferably at most 5 mass % based on the polymerizable liquid crystal composition, and it is more preferably at most 2 mass %. Further, when said other compound that is a non-polymerizable compound other than the above additives, is added, the amount is within a range not deteriorating the effects of the present invention, and the amount of said other compound is preferably at most 10 mass %, more preferably at most 5 mass %.

The optically anisotropic material of the present invention is a polymer obtainable by polymerizing the polymerizable liquid crystal composition in a state that the polymerizable liquid crystal composition shows a liquid crystal phase and that the liquid crystal is aligned.

The state that the polymerizable liquid crystal composition shows liquid crystallinity, can be maintained by making the ambient temperature at most the nematic phase-isotropic phase phase transition temperature ($T_c$). However, since Δn of the polymerizable liquid crystal composition is extremely small at a temperature close to $T_c$, the upper limit of the ambient temperature is preferably at most ($T_c$−10).

As the polymerization method of the above polymerizable liquid crystal composition, photopolymerization or thermopolymerization etc. may be mentioned. From the viewpoint of easiness of maintaining liquid crystallinity or easiness of curing, photopolymerization is preferred. As light to be used for photopolymerization, UV rays or visible light is preferred. In a case of carrying out photopolymerization, a photopolymerization initiator is preferably employed. For example, such a photopolymerization initiator is preferably one appropriately selected from the group consisting of an acetophenone, a benzophenone, a benzoin, a benzyl, a Michler ketone, a benzoin alkyl ether, a benzyl dimethyl ketal and a thioxanthone. One or at least two types of photopolymerization initiators may be used in combination. The amount of photopolymerization initiator based on the total amount (100 mass %) of the polymerizable liquid crystal composition is preferably from 0.01 to 5 mass %, particularly preferably from 0.01 to 2 mass %.

The optically anisotropic material can be obtained by polymerizing the above-mentioned polymerizable liquid crystal composition in a state that it is sandwiched between a pair of substrates each having a surface on which an alignment treatment is applied. Specific examples will be described as follows.

First, a transparent substrate is prepared. As the transparent substrate, for example, a substrate made of a material having a high transmittance for visible light may be employed. Specifically, it may, for example, be a substrate made of an inorganic glass such as an alkaline glass, a non-alkaline glass or a quartz glass; or a transparent resin such as polyester, polycarbonate, polyether, polysulfone, polyether sulfone, polyvinyl alcohol or a fluoropolymer such as a polyvinyl fluoride. From the viewpoint of high rigidity, a substrate made of an inorganic glass is preferably employed. The thickness of the transparent substrate is not particularly limited, and usually, it is from 0.2 to 1.5 mm, preferably from 0.3 to 1.1 mm. The transparent substrate may be provided with a surface treatment layer made of an inorganic material or an organic material for the purpose of preventing alkaline elution, improving adhesiveness, preventing reflection or obtaining a hard coat function.

Next, an alignment treatment is applied to a surface of the transparent substrate. For example, an alignment film is formed on the transparent substrate, and an alignment treatment is applied to the alignment film. The alignment film may be any one so long as it has a function of aligning the liquid crystal. It may, for example, be an organic material such as polyimide, polyamide, polyvinyl alcohol, polyvinyl cinnamate or polystyrene, or an inorganic material such as $SiO_2$ or $Al_2O_3$. The alignment treatment may, specifically, be carried out by e.g. a rubbing method. For example, by rubbing a surface of the alignment film in one direction by using a rubbing cloth made of nylon or rayon, it is possible to make liquid crystal molecules align in the direction. Further, other than the rubbing method, it is possible to uniformly align liquid crystal molecules by oblique vapor deposition of SiO, an ion beam method, a photoalignment film, etc.

Next, an optically anisotropic material is formed on the alignment film. Besides the above transparent substrate (hereinafter referred to as first substrate), a second substrate having a surface on which an alignment film is formed is prepared. This alignment film may be formed in the same manner as one for the first substrate. Next, as the case requires, a mold-releasing treatment is applied on a surface of the second substrate on which the alignment film is formed. The mold-releasing agent may, for example, be a fluoropolymer of fluorosilane type or a fluoropolymer having a fluoroalicyclic structure. Next, on this second substrate, the first substrate is overlaid and they are preliminarily bonded so that a gap is present between them. The overlay is made so that the surface of the second substrate on which the mold-releasing treatment is applied or the surface of the substrate on which an alignment film is formed and the surface of the first substrate on which the alignment film is formed, face to the inside to each other. Further, an opening capable of injecting the polymerizable liquid crystal composition from the outside is provided in advance. Next, through the opening, the polymerizable liquid crystal composition of the present invention is injected between the substrates. This injection may be carried out by a vacuum injection method or a method using a capillary phenomena in the atmospheric air. After the injection of the polymerizable liquid crystal composition, the polymerizable liquid crystal composition is polymerized by radiating light having a predetermined wavelength. As the case requires, a heating treatment may be applied after the radiation of light. Thereafter, as the case requires, by removing the second substrate that has been preliminarily bonded, a structure in which an alignment film and an optically anisotropic material are formed on the first substrate or between two substrates, can be obtained. In this embodiment, the polymerizable liquid crystal composition is aligned in a direction substantially parallel with the surface of the first substrate, and the optically anisotropic material in a state that such an alignment is fixed is obtained.

Further, formation of the optically anisotropic material may also be carried out, for example, in the following procedure.

First, a first substrate on which an alignment film is formed and a second substrate on which an alignment film is formed and further a mold-releasing agent is applied as the case requires, are prepared. Next, on the alignment film formed on the first substrate, a photocurable polymerizable liquid crystal composition is dropped. Thereafter, the second substrate is overlaid on the first substrate so that the surface of the second substrate on which the alignment film is formed or the mold-releasing agent is applied faces to the polymerizable liquid crystal composition. Next, light having a predetermined wavelength is radiated to the polymerizable liquid crystal composition to polymerize the composition. Thereafter, by removing the second substrate as the case requires, a structure in which the alignment film and the optically anisotropic material are formed on the first substrate or between two substrates, can be obtained in the same manner as above.

The optically anisotropic material of the present invention may be employed as a material of an optical element. In the above explanation, only the alignment film is mentioned to simplify the explanation, but it is possible to provide an electrode for the purpose of controlling optical properties, or it is possible to provide a reflective film for the purpose of using the optical element as a reflection type element. Further, depending on the purpose, it is possible to provide a Fresnel lens structure, a grating for diffraction grating, a colored layer for color tone adjustment or a low reflective layer for suppressing stray light etc. on a surface of the substrate.

The optical element of the present invention may have a construction wherein two optical elements are combined. Further, the optical element of the present invention may be combined with another optical element such as a lens, a wavefront correction surface, a phase difference plate, an iris or a diffraction grating, etc. In the case of such a structure may be formed by forming these optical elements each employing two substrates and laminating them, or such a structure may be formed by forming two liquid crystal layers among three substrates.

It is possible to produce a diffraction grating such as a polarizing hologram or an optical element such as a phase difference plate or a wavefront correction element by employing the optically anisotropic material of the present invention. As the polarizing hologram, an example of separating signal light that is light emitted from a light source and reflected from an information recording plane of an optical disk, to guide such signal light to a photodetector, is mentioned. As the phase difference plate, an example of employing such a phase difference plate as a half wavelength plate for controlling the phase difference of light emitted from a laser light source, or an example of using such a phase difference plate as a quarter wavelength plate to be disposed in an optical path in order to stabilize the output of a laser light source, may, for example, be mentioned. Further, the optically anisotropic material of the present invention is applicable to e.g. a phase difference plate or a polarizer for projector application.

For example, it is possible to constitute a diffraction grating wherein a member (first member) made of a first material containing the optically anisotropic material of the present invention and a member (second member) made of a second material having an isotropic refractive index, are alternately arranged to form a grating shape. By alternately disposing a first member having an optical anisotropy and the second member that is isotropic, light passing through these members causes a diffraction that changes depending on the polarization direction of the light, whereby a diffraction grating having a polarizing dependence is constituted.

The optical element having the optically anisotropic material of the present invention, is suitable to be employed for an optical information writing/reading device for recording an information in an optical recording medium and/or for reading an information recorded in the optical recording medium. Specifically, the optical element of the present invention is suitably disposed in an optical path of laser beam in an information writing/reading device. Particularly, the element is suitable for an optical head for an optical information writing/reading device for BD or HDDVD using a blue laser beam. Besides this application, the optical element can be suitably used as an imaging element in projector application or as a wavelength-variable filter in communication device application.

For example, in an optical information writing/reading device employing the above diffraction grating, light reflected from an optical recording medium is diffracted by the diffraction grating. Here, the optical information writing/reading device may have, besides the diffraction grating, a light source for emitting light to be incident into the diffraction grating, an objective lens for condensing light emitted from the light source on the optical recording medium, a detector for detecting light reflected from the optical recording medium, etc.

Further, the optical information writing/reading device may have a phase difference plate prepared by employing the optically anisotropic material of the present invention. The phase difference plate in this case plays a role of transmitting light from a light source and changing the polarization state of the light reflected at an optical disk. For example, when the phase difference plate is a quarter wavelength plate, the polarization state of light reflected by an optical disk, is transformed by the phase difference plate into circularly polarized light or elliptically polarized light when the above light is linearly polarized light, and into linearly polarized light when the above light is circularly polarized light in terms of the polarization plane. Further, when the phase difference plate is a half wavelength plate instead of quarter wavelength plate, P polarized light is transformed into S polarized light, S polarized light is transformed into P polarized light, circularly polarized light (dextrorotation) is transformed into circularly polarized light (levorotation), and circularly polarized light (levorotation) is transformed into circularly polarized light (dextrorotation).

FIG. 1 shows an example of optical information writing/reading device employing the phase difference plate of the present invention. In this optical information writing/reading device, an information recorded in an optical disk is read out in the following manner.

Linearly polarized light emitted from a light source 1 is transmitted through a beam splitter 2, a collimator lens 3, a phase difference plate 4 and an objective lens 5, and reach an information recording plane of an optical disk 6. In this process, the linearly polarized light is transmitted through the beam splitter with its polarized direction unchanged, and is transformed into circularly polarized light by the phase difference plate 4 having a phase difference of quarter wavelength. Thereafter, the light is reflected at the information recording plane of the optical disk 6 to be transformed into circularly polarized light of reverse direction, and traces back through the objective lens 5, the phase difference plate 4 and the collimator lens 3 in this order through the returning path in the reverse order of the outgoing path. Here, by the phase difference plate 4 in the returning path, the circularly polarized light is transformed into linearly polarized light perpendicular to the linearly polarized light before it is incident into the phase difference plate 4. Accordingly, since the polarization direction of linearly polarized light in the returning path is different from that of the outgoing path by 90°, the propagation direction of the linearly polarized light in the returning path is turned by 90° when it passes through the beam splitter 2, and the light reaches a photodetector 7.

As the light source 1, a normal laser light source to be employed for normal optical information writing/reading device is used.

Specifically, a semiconductor laser is suitable, but it may be any one of other lasers. The phase difference plate 4 has a good durability against a blue laser beam, and accordingly, by using a blue laser beam as a light source, it is possible to increase the capacity of an optical information writing/reading device.

Here, the optically anisotropic material of the present invention may be applied to a beam splitter 2 of FIG. 7. Specifically, the optically anisotropic material is disposed as a polarization-dependent diffraction grating. With such a construction, it is possible to increase the transmittance for light having a polarization direction of outgoing path, and it is possible to increase the diffraction efficiency of light having a polarization direction of returning path that is perpendicular to the polarization direction of outgoing path. Accordingly, it is possible to further improve the light utilization efficiency of the entire optical information writing/reading device.

EXAMPLES

Now, the present invention will be described in further detail with reference to Examples, but the present invention should not be construed as limited to these Examples.

In this section, synthesis of polymerizable compounds, preparation of a polymerizable liquid crystal compositions employing the obtained polymerizable compounds, preparation of optical elements employing optically anisotropic materials obtained by polymerizing the polymerizable liquid crystal compositions, and evaluation result of the obtained optical elements, will be described with reference to specific examples.

<Synthesis of Polymerizable Compound>

Example 1

First, a compound (12) was synthesized according to the following equation.

First, into a 2,000 mL four-port flask, 50 g (0.40 mol) of compound (11), 1,200 mL of dichloromethane, 142.6 g (1.19 mol) of sodium dihydrogen phosphate, 151.1 g (0.52 mol) of methachloro perbenzoic acid (m-CPBA) and 15.1 g (0.08 mol) of paratoluene sulfonic acid (cat. TsOH) as a catalyst, were added, and reflux was carried out at 45° C. for 24 hours while the mixture was stirred.

After reaction was completed, the temperature of the reaction mixture was returned to room temperature, and filtering was carried out by using a silica gel to recover an organic layer. The organic layer was washed with a saturated sodium thiosulfate aqueous solution, a saturated sodium hydrogen carbonate aqueous solution and brine in this order, and dried over sodium sulfate anhydride, and the solvent was removed by evaporation to obtain an unpurified compound (12').

The compound (12') was purified by a silica gel column chromatography using hexane/ethyl acetate (19:1, volume ratio) as a developing solvent, to obtain 24.7 g of a compound (12). The yield was 43%. Further, by this purification, 28 g of a compound (11) was recovered.

Next, using the obtained compound (12), a compound (13) was synthesized according to the following equation.

First, into a 1,000 mL round-bottom flask, 24.7 g (0.17 mol) of compound (12) and 250 mL of a 0.78 M potassium hydroxide aqueous solution were added, and they were stirred at room temperature for 3 hours. After reaction was completed, dichloromethane was added, and a 1 N hydrochloric acid was added until the reacted solution became acidic while the flask was ice-cooled. Next, the organic layer was separated, the aqueous layer was extracted with ethyl acetate and the extract was combined with the organic layer and dried over sodium sulfate anhydride. Thereafter, the solvent was removed by evaporation to obtain an unpurified reacted product A.

Next, into a 1,000 mL round-bottom flask, the unpurified reacted product A obtained above, 700 mL of dichloromethane, 35.7 g (0.44 mol) of 3,4-dihydro-2H-pyran (DHP) and 4.4 g (0.02 mol) of pyridinium-paratoluene sulfonic acid (cat. PPTS) as a catalyst, were added and they were stirred for 12 hours.

After reaction was completed, a saturated sodium hydrogen carbonate aqueous solution was added until the reacted solution became mild alkaline, and the organic layer was separated. The aqueous layer was extracted with ethyl acetate, and the extract was combined with the organic layer and washed with brine. Thereafter, the organic layer was dried over sodium sulfate anhydride, and the solvent was removed by evaporation to obtain an unpurified reacted product B.

Next, into a 1,000 mL round-bottom flask, the unpurified reacted product B obtained above and 400 mL of a 0.62 M potassium hydroxide aqueous solution were added, and they were stirred at 100° C. for 3 hours. After reaction was completed, the reaction mixture was returned to room temperature, dichloromethane was added and a 0.5 M acetic acid aqueous solution was added so that pH of the reacted solution became 6 while the flask was ice-cooled. Thereafter, an organic layer was separated, the aqueous layer was extracted with ethyl acetate, and the extract was combined with the organic layer and dried over sodium sulfate anhydride. Subsequently, the solvent was removed by evaporation to obtain an unpurified compound (13'). Here, THP of formula (13) and formula (15) to be described later, means tetrahydro-2H-pyran.

The compound (13') was purified by a silica gel column chromatography using hexane-ethyl acetate (2:1, volume ratio) as a developing solvent, to obtain 25.5 g of a compound (13). The yield was 60%.

Trans-trans-bicyclohexanediol (14) was separated and purified from a mixture of bicyclohexanediol.

Mixture
(14')

trans-trans
(14)

First, methanol was added to 50 g of a mixture (14') of bicyclohexanediol isomer while they were heated at 55° C. by hot water, to melt the mixture. Subsequently, the mixture was returned to room temperature and left at −25° C. for 12 hours. By filtering generated crystals, 22.7 g of trans-trans-bicyclohexanediol (14) was obtained.

Next, using the compound (13) obtained above and a trans-trans-bicyclohexanediol (14), a compound (15) was synthesized according to the following equation.

Into a 1,000 mL four-port flask, 8.3 g (33.8 mmol) of compound (13), 3.4 g (16.9 mmol) of trans-trans-bicyclohexanediol (14), 200 mL of dichloromethane, 13.0 g of (67.5 mmol) of 1-ethyl-3-(dimethylaminopropyl)carbodiimide hydrochloride (EDC) and 2.1 g (16.9 mmol) of 4-dimethylaminopyridine (cat. DMAP) as a catalyst, were added, and they were stirred at room temperature for 12 hours. Subsequently, the reaction was terminated by the addition of a saturated ammonium chloride aqueous solution, an organic layer was separated, and the aqueous layer was extracted with ethyl acetate. The extract was combined with the organic layer and washed with a saturated sodium hydrogen carbonate aqueous solution and brine in this order, and dried over sodium sulfate anhydride, and the solvent was removed by evaporation to obtain an unpurified compound (15').

The compound (15') was purified by a silica gel column chromatography using hexane/ethyl acetate (4:1, volume ratio) as a developing solvent to obtain 8.5 g of a compound (15). The yield was 77%.

Next, using the compound (15) obtained above, a compound (16) was synthesized according to the following equation.

First, into a 1,000 mL round-bottom flask, 10.4 g (16.0 mmol) of compound (15), 400 mL of methyl alcohol, 200 mL of tetrahydrofuran (THF) and 0.4 g (1.6 mmol) of pyridinium-paratoluene sulfonic acid as a catalyst, were added, and they were stirred at 40° C. for 12 hours. After reaction was completed, a saturated sodium hydrogen carbonate aqueous solution was added to make the reacted solution mild alkaline, an aqueous layer and an organic layer were separated, and the organic layer was removed by evaporation. Thereafter, purification was carried out by a column chromatography using dichloromethane/methanol (19:1, volume ratio) to obtain 7.1 g of a compound (16). The yield was 91%.

Next, using the compound (16) obtained above, a polymerizable compound (1A-1) was synthesized according to the following equation.

(16)

(1A-1)

First, into a 500 mL four-port flask, 5.9 g (12.2 mmol) of compound (16), 5.1 mL (36.7 mmol) of triethylamine and 200 mL of dichloromethane were added. Subsequently, in a flow of nitrogen, while the flask was ice-cooled so that the temperature inside the flask did not exceed 20° C., 2.4 mL (29.3 mmol) of acryloyl chloride was dropped, and the mixture was stirred for 3 hours. After reaction was completed, dichloromethane and acrylic acid chloride were removed by evaporation, and the residue was purified by a silica gel column chromatography using dichloromethane/ethyl acetate (33:1) as a developing solvent. Thereafter, recrystallization was further carried out by using dichloromethane/hexane, to obtain 4.3 g of a polymerizable compound (1A-1). The yield was 60%.

Figure 2:
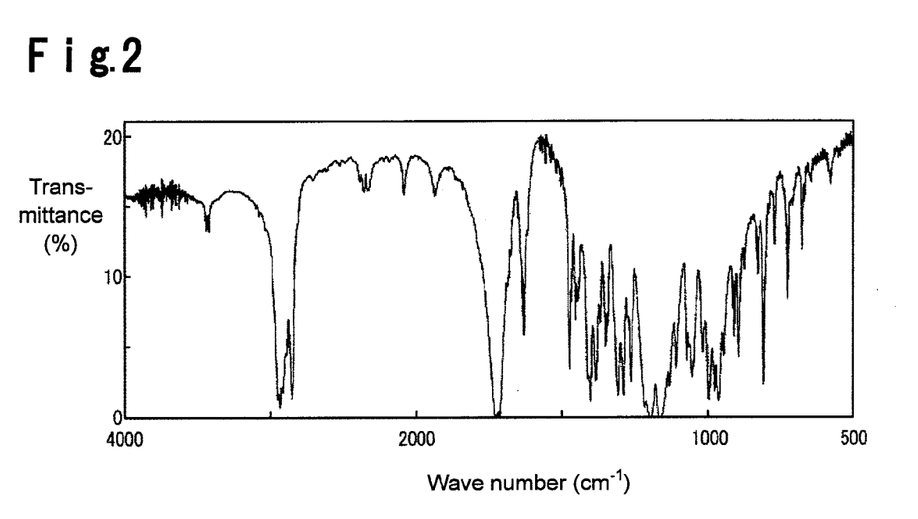
FIG. 2 is a view showing the IR spectrum of polymerizable liquid crystal compound (1A-1).

FIG. 2 shows an IR (infrared absorption) spectrum of the polymerizable compound (1A-1). Further, $^1$HNMR ($^1$H nuclear magnetic resonance) spectrum is shown below.

$^1$HNMR (400 MHz, solvent: CDCl$_3$, internal standard: TMS) δ (ppm): 1.05-1.12 (m, 6H), 1.25-1.38 (m, 16H), 1.58-1.70 (m, 8H), 1.75-1.78 (m, 4H), 1.96-2.00 (m, 4H), 2.26 (t, 4H), 4.14 (t, 4H), 4.63 (m, 2H), 5.81 (d, 2H), 6.12 (dd, 1H), 6.40 (d, 1H)

The melting point of the polymerizable compound (1A-1) at a time of heating was 91° C. Further, at a time of cooling, a smectic phase showed a smectic phase at from 64° C. to 57° C.

<Preparation of Polymerizable Liquid Crystal Composition>

The polymerizable compound (1A-1) obtained above and a composition E were mixed at the ratios shown in Table 1 to obtain polymerizable liquid crystal compositions A to D. The composition E was a mixture of the following compounds (2-1-1a), (2-1-1b), (3-2-1a) and (3-2-1b), that are polymerizable liquid crystal compounds other than the polymerizable compound (1A-1), at a ratio of 3:3:1:1 (molar ratio). Here, each ratio described in Table 1 is a ratio (mol %) of each polymerizable compound (polymerizable compound (1A-1) and composition E) based on all polymerizable compounds constituting a polymerizable liquid crystal composition. Further, Table 1 also shows the values of $T_m$ and $T_c$ of each of polymerizable liquid crystal compositions A to D. The polymerizable liquid crystal compositions A to C each showed a nematic liquid crystal phase between the melting point and the transparent point, and the polymerizable liquid crystal composition D showed a smectic liquid crystal phase (measured in cooling).

(2-1-1a)

(2-1-1b)

(3-2-1a)

(3-2-1b)

TABLE 1

| | Polymerizable liquid crystal composition | | | |
|---|---|---|---|---|
| | A | B | C | D |
| Polymerizable compound (1A-1) | 10 | 20 | 30 | 100 |
| Composition E | 90 | 80 | 70 | 0 |
| $T_m$ (° C.)* | Room temperature | 40 | 50 | 57** |
| $T_c$ (° C.)* | 99 | 85 | 75 | 64** |

*Phase transition point in cooling
**Smectic phase

<Preparation of Optical Element A>

On a glass substrate of 5 cm high, 5 cm wide and 0.5 mm thick, a polyimide solution was applied by a spin coater, and subjected to a rubbing treatment in one direction by a nylon cloth to prepare a supporting member.

Next, two such supporting members were laminated by using an adhesive agent so that faces of the supporting members subjected to the alignment treatment faced to each other, to prepare a cell. Into the adhesive agent, glass beads of 3.3 µm in diameter were added in advance so that the distance between the supporting members became 3.3 µm.

Next, to the polymerizable liquid crystal composition A, a polymerization initiator in an amount of 0.5 mass % based on the polymerizable liquid crystal composition A, was added to obtain a polymerizable liquid crystal composition A1. Here, as the photopolymerization initiator, "IRGACURE 754" (product name) manufactured by Ciba Specialty Chemicals K.K. was employed.

optical elements obtained, evaluations were carried out in the same manner as the optical element A. Table 2 shows the results.

There was no problem in initial evaluations of the optical elements B and C, and the optical element D did not show liquid crystallinity. Further, the optical elements B, C and D each showed a transmittance change of less than 1% at 30 W·hr/mm² in the acceleration test. Further, the transmittance change of each of the optical elements C and D was less than 1% at 40 W·hr/mm².

TABLE 2

| | | Ex. 1 Optical element A | Ex. 2 Optical element B | Ex. 3 Optical element C | Ex. 4 Optical element D |
|---|---|---|---|---|---|
| Preparation conditions | Cell gap (µm) | 3.3 | 3.3 | 3.3 | 3.3 |
| | Polymerization temperature (° C.) | 85 | 60 | 70 | 110 |
| | UV intensity (mW/cm²) | 50 | 50 | 50 | 50 |
| | Integrated light amount (mJ/cm²) | 9,000 | 9,000 | 9,000 | 9,000 |
| Initial evaluation | Transparency | Transparent | Transparent | Transparent | Transparent |
| | Alignment of liquid crystal | Horizontal alignment | Horizontal alignment | Horizontal alignment | Random alignment |
| | $\Delta n$ ($\lambda = 405$ nm) | 0.0182 | 0.0315 | 0.0363 | None |
| Acceleration test Temperature: 80° C. Integrated light amount: 30 W·hr/mm² | Change of transmittance | Less than 1% | Less than 1% | Less than 1% | Less than 1% |
| Acceleration test Temperature: 80° C. Integrated light amount: 40 W·hr/mm² | Change of transmittance | 2.5% | 1.7% | Less than 1% | Less than 1% |

Into the cell, the polymerizable liquid crystal composition A1 was injected at a temperature of 85° C. Subsequently, at a temperature of 85° C., UV rays having an intensity of 50 mW/cm² were radiated so that the integrated light amount became 9,000 mJ/cm² to carry out photopolymerization to obtain an optical element A.

In the optical element A, liquid crystal was horizontally aligned in the rubbing direction of the substrates. Further, the optical element A was transparent in the visible region, and no scattering was recognized. Further, the refractive index anisotropy $\Delta n$ for a laser beam having a wavelength of 405 nm was 0.0182.

<Evaluation of Optical Element A>

Kr laser beam (multimode of wavelengths of 407 nm and 413 nm) was radiated to the optical element A to carry out a blue laser beam exposure acceleration test. The radiation conditions were such that the temperature was 80° C., the exposure energy was 69 mW/mm² and the integrated exposure energies were 30 W·hr/mm² and 40 W·hr/mm². The decrease of the transmittance by the test based on the transmittance before the test was less than 1% at 30 W·hr/mm² and 2.5% at 40 W·hr/mm².

Examples 2 to 4

To each of the polymerizable liquid crystal compositions B, C and D, a polymerization initiator in an amount of 0.5 mass % in terms of the ratio to the composition was added, to obtain polymerizable liquid crystal compositions B1, C1 and D1. Here, as the photopolymerization initiator, "IRGACURE 754" (product name) manufactured by Ciba Specialty Chemicals K.K. was employed. By using these polymerizable liquid crystal compositions, optical elements B, C and D were prepared in the same manner as Example 1. With respect to the Example 5

To the composition E, a photopolymerization initiator in an amount of 0.5 mass % to the composition E was added to obtain a polymerizable liquid crystal composition E1. Here, as the photopolymerization initiator, "IRGACURE 754" (product name) manufactured by Ciba Specialty Chemicals K.K. was employed. An optical element E was prepared in the same manner as Example 1, and evaluation was carried out in the same manner as the optical element A. Table 3 shows the results.

Here, in Table 3, "-" means no evaluation.

In the optical element E, liquid crystal was horizontally aligned in the rubbing direction of the substrates. Further, the optical element E was transparent in the visible region, and no scattering was recognized. Further, $\Delta n$ for a laser beam having a wavelength of 405 nm was 0.0057. However, the transmittance change of the optical element E was 3.0% at 30 W·hr/mm² in the acceleration test evaluation, and the optical element E was recognized to be deteriorated.

TABLE 3

| | | Ex. 5 Optical element E |
|---|---|---|
| Preparation conditions | Cell gap (µm) | 3.3 |
| | Polymerization temperature (° C.) | 30 |
| | UV intensity (mW/cm²) | 50 |
| | Integrated light amount (mJ/cm²) | 9,000 |

TABLE 3-continued

|  |  | Ex. 5 Optical element E |
|---|---|---|
| Initial evaluation | Transparency | Transparent |
|  | Alignment of liquid crystal | Horizontal alignment |
|  | Δn (λ = 405 nm) | 0.0057 |
| Acceleration test Temperature: 80° C. Integrated light amount: 30 W · hr/mm² | Change of transmittance | 3.0% |
| Acceleration test Temperature: 80° C. Integrated light amount: 40 W · hr/mm² | Change of transmittance | — |

INDUSTRIAL APPLICABILITY

The present invention provides an optically anisotropic material having a good durability against a blue laser beam, and the present invention is applicable to optical elements employing such an optically anisotropic material, specifically, to diffraction gratings, hologram elements, lens elements, aberration correction elements, phase difference plates, etc. Further, the present invention can provide an optical information writing/reading device employing the above optical element, and the present invention is suitable for an optical head device for an optical information writing/reading device employing a blue laser beam such as for BDs. Accordingly, the present invention is useful in industries.

The entire disclosure of Japanese Patent Application No. 2008-170499 filed on Jun. 30, 2008 including specification, claims, drawings and summary is incorporated herein by reference in its entirety.

EXPLANATION OF NUMERALS

1: Light source
2: Beam splitter
3: Collimator lens
4: Phase difference plate
5: Objective lens
6: Optical disk
7: Photodetector

What is claimed is:

1. An optically anisotropic material obtainable by polymerizing a polymerizable liquid crystal composition comprising at least 5 mol % of at least one polymerizable compound represented by the following formula (1):

$$CH_2=CR^1-COO-K-Cy-Cy-L-OCO-CR^2=CH_2 \quad (1)$$

wherein $R^1$ and $R^2$ are each independently a hydrogen atom or a methyl group;
K is —$(CH_2)_p$COO— or —$(CH_2)_q$OCO—, wherein an etheric oxygen atom may be present in a carbon to carbon bond in an alkylene group and some or all of hydrogen atoms may be substituted by a fluorine atom or a methyl group (where p and q each independently represents an integer of from 1 to 12);
L is —OCO$(CH_2)_r$— or —COO$(CH_2)_s$—, wherein an etheric oxygen atom may be present in a carbon to carbon bond in an alkylene group and some or all of hydrogen atoms may be substituted by a fluorine atom or a methyl group (where r and s each independently represents an integer of from 1 to 12); and
Cy is a trans-1,4-cyclohexylene group wherein some or all of hydrogen atoms may be substituted by a fluorine atom or a methyl group.

2. The optically anisotropic material according to claim 1, wherein in formula (1), K is —$(CH_2)_p$COO— wherein some or all hydrogen atoms in the alkylene group may be substituted by a fluorine atom or a methyl group, and L is —OCO$(CH_2)_r$— wherein some or all hydrogen atoms in the alkylene group may be substituted by a fluorine atom or a methyl group.

3. The optically anisotropic material according to claim 2, wherein in formula (1), $R^1$ and $R^2$ are each a hydrogen atom;
K is —$(CH_2)_p$COO— wherein some or all hydrogen atoms in the alkylene group may be substituted by fluorine atoms; and
L is —OCO$(CH_2)_r$— wherein some or all hydrogen atoms in the alkylene group may be substituted by fluorine atoms.

4. The optically anisotropic material according to claim 3, wherein in formula (1), K is —$(CH_2)_p$COO— wherein the alkylene group is a non-substituted alkylene group; and L is —OCO$(CH_2)_r$— wherein the alkylene group is a non-substituted alkylene group.

5. The optically anisotropic material according to claim 1, wherein the polymerizable liquid crystal composition comprises a polymerizable compound other than the polymerizable compound represented by formula (1), and the polymerizable compound has no aromatic ring.

6. The optically anisotropic material according to claim 5, wherein the polymerizable liquid crystal composition comprises as the polymerizable compound other than the polymerizable compound represented by formula (1) at least one polymerizable compound selected from the group consisting of a polymerizable compound represented by the following formula (2) and a polymerizable compound represented by the following formula (3):

$$CH_2=CR^3-COO-(M)_m-Cy-Cy-R^4 \quad (2),$$

$$CH_2=CR^5-COO-(N)_n-Cy-COO-Cy-Cy-R^6 \quad (3).$$

wherein $R^3$ and $R^5$ are each independently a hydrogen atom or a methyl group; $R^4$ and $R^6$ are each independently a $C_{1-12}$ alkyl group wherein some or all hydrogen atoms may be substituted by a fluorine atom or a methyl group;
M is —$(CH_2)_a$COO—, —$(CH_2)_b$OCO—, —$(CH_2)_c$O— or —$(CH_2)_d$—, wherein an etheric oxygen atom may be present in a carbon to carbon bond in the alkylene group and some or all hydrogen atoms may be substituted by a fluorine atom or a methyl group (where a, b, c and d each independently represents an integer of from 1 to 12);
N is —$(CH_2)_e$COO—, —$(CH_2)_f$OCO—, —$(CH_2)_g$O— or —$(CH_2)_h$—, wherein an etheric oxygen atom is present in a carbon to carbon bond in the alkylene group and some or all hydrogen atoms may be substituted by a fluorine atom or a methyl group (where e, f, g and h each independently represents an integer of from 1 to 12);
m and n each independently 0 or 1; and
Cy is a trans-1,4-cyclohexylene group wherein some or all hydrogen atoms may be substituted by a fluorine atom or a methyl group.

7. The optically anisotropic material according to claim 1, which is obtainable by polymerizing the polymerizable liquid crystal composition in a state that the polymerizable liquid crystal composition shows a liquid crystal phase and that the liquid crystal is aligned.

8. An optical element comprising the optically anisotropic material as defined in claim 1.

9. An optical information recording/reproduction device for recording an information on an optical recording medium and/or reading an information recorded in an optical recording medium, which comprises the optical element as defined in claim 8.

10. The optically anisotropic material according to claim 1, wherein in formula (1), K is $-(CH_2)_p COO-$, and L is $-COO(CH_2)_s-$.

11. The optically anisotropic material according to claim 1, wherein in formula (1), K is $-(CH_2)_q OCO-$, and L is $-COO(CH_2)_r-$.

12. The optically anisotropic material according to claim 1, wherein in formula (1), K is $-(CH_2)_q OCO-$, and L is $-COO(CH_2)_s-$.

* * * * *